US009692886B2

(12) United States Patent
Mufti et al.

(10) Patent No.: US 9,692,886 B2
(45) Date of Patent: Jun. 27, 2017

(54) TELECONFERENCING SYSTEM USING SYNTHETIC IDENTIFIERS

(71) Applicant: T-Mobile USA, Inc., Bellevue, WA (US)

(72) Inventors: Shujaur Mufti, Snoqualmie, WA (US); Zeeshan Jahangir, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/849,432

(22) Filed: Sep. 9, 2015

(65) Prior Publication Data

US 2016/0080559 A1   Mar. 17, 2016

Related U.S. Application Data

(60) Provisional application No. 62/049,197, filed on Sep. 11, 2014.

(51) Int. Cl.
*H04M 3/42* (2006.01)
*H04W 4/06* (2009.01)
(Continued)

(52) U.S. Cl.
CPC .... *H04M 3/42008* (2013.01); *H04L 65/1006* (2013.01); *H04L 65/1069* (2013.01);
(Continued)

(58) Field of Classification Search
CPC ........... H04W 4/06; H04W 4/08; H04W 4/16; H04W 8/18; H04M 1/575;
(Continued)

(56) References Cited

U.S. PATENT DOCUMENTS

2002/0029350 A1  3/2002  Cooper et al.
2004/0047461 A1*  3/2004  Weisman .......... H04M 3/42008
                                                          379/202.01
(Continued)

FOREIGN PATENT DOCUMENTS

EP         2285068         2/2011

OTHER PUBLICATIONS

Mauthe, et al., "From Requirements to Services: Group Communication Support for Distributed Multimedia Systems", Proceedings of the Second International Workshop on Advanced Teleservices and High-Speed Communication Architectures, vol. 868 of Lecture Notes in Computer Science, Sep. 1994, 13 pages.
PCT Search Report and Written Opinion mailed Dec. 7, 2015 for PCT Application No. PCT/US15/49417, 12 pages.

*Primary Examiner* — Temica M Beamer
(74) *Attorney, Agent, or Firm* — Lee & Hayes, PLLC

(57) ABSTRACT

In some implementations, a teleconference server can receive a connection request corresponding to a party, determine that the party is a non-self-specified party in a specified teleconference, and determine a party-specific synthetic identifier for the party. In some implementations, a telecommunications network can include terminals and a teleconference server configured to receive one or more connection requests corresponding to respective parties, determine that one or more of the parties are non-self-specified parties, and determine respective party-specific synthetic identifiers for at least some of the non-self-specified parties. In some implementations, a connection request corresponding to a party can be received. The connection request can specify a teleconference. A party-specific synthetic identifier for the party can be determined, e.g., after determining that the party is a non-self-specified party in the specified teleconference.

19 Claims, 9 Drawing Sheets

(51) Int. Cl.
*H04L 29/06* (2006.01)
*H04W 12/00* (2009.01)
*H04W 12/02* (2009.01)
*H04L 29/12* (2006.01)
*H04M 3/56* (2006.01)

(52) U.S. Cl.
CPC ...... *H04L 65/1093* (2013.01); *H04L 65/4038* (2013.01); *H04W 4/06* (2013.01); *H04W 12/00* (2013.01); *H04L 61/3085* (2013.01); *H04M 3/56* (2013.01); *H04W 12/02* (2013.01)

(58) Field of Classification Search
CPC ......... H04M 3/42008; H04M 3/42042; H04M 3/56; H04M 9/02; H04M 2250/62
USPC ...... 455/414.1, 415, 416; 379/93.21, 142.09, 379/157, 201.11, 202.01
See application file for complete search history.

(56) References Cited

U.S. PATENT DOCUMENTS

| | | |
|---|---|---|
| 2005/0276405 A1 | 12/2005 | Fernandes et al. |
| 2006/0023061 A1* | 2/2006 | Vaszary ............... H04M 3/56 348/14.08 |
| 2008/0160976 A1 | 7/2008 | Virolainen et al. |
| 2009/0113316 A1* | 4/2009 | Palermo ............... G06Q 30/02 715/758 |
| 2012/0170726 A1* | 7/2012 | Schwartz ............. H04M 3/38 379/93.02 |
| 2013/0282803 A1* | 10/2013 | Boyer ................. H04N 7/147 709/204 |
| 2015/0249748 A1* | 9/2015 | Scriven ............... H04L 12/1822 379/202.01 |

\* cited by examiner

TELECONFERENCING SYSTEM USING SYNTHETIC IDENTIFIERS

CROSS-REFERENCE TO RELATED APPLICATIONS

This application is a nonprovisional application of, and claims priority to and the benefit of, U.S. Provisional Patent Application Ser. No. 62/049,197, filed Sep. 11, 2014 and entitled "Anonymous Caller Handling for Conference Calls," the entirety of which is incorporated herein by reference.

BACKGROUND

Teleconferencing services are generally provided by teleconference servers and can include, e.g., multi-party calls interconnecting tens or hundreds of individual terminals. However, not all terminals connectable via a teleconference server necessarily support the same types of information exchanges with the teleconference server. This can restrict the ability of users to manage teleconferences and users participating in teleconferences.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
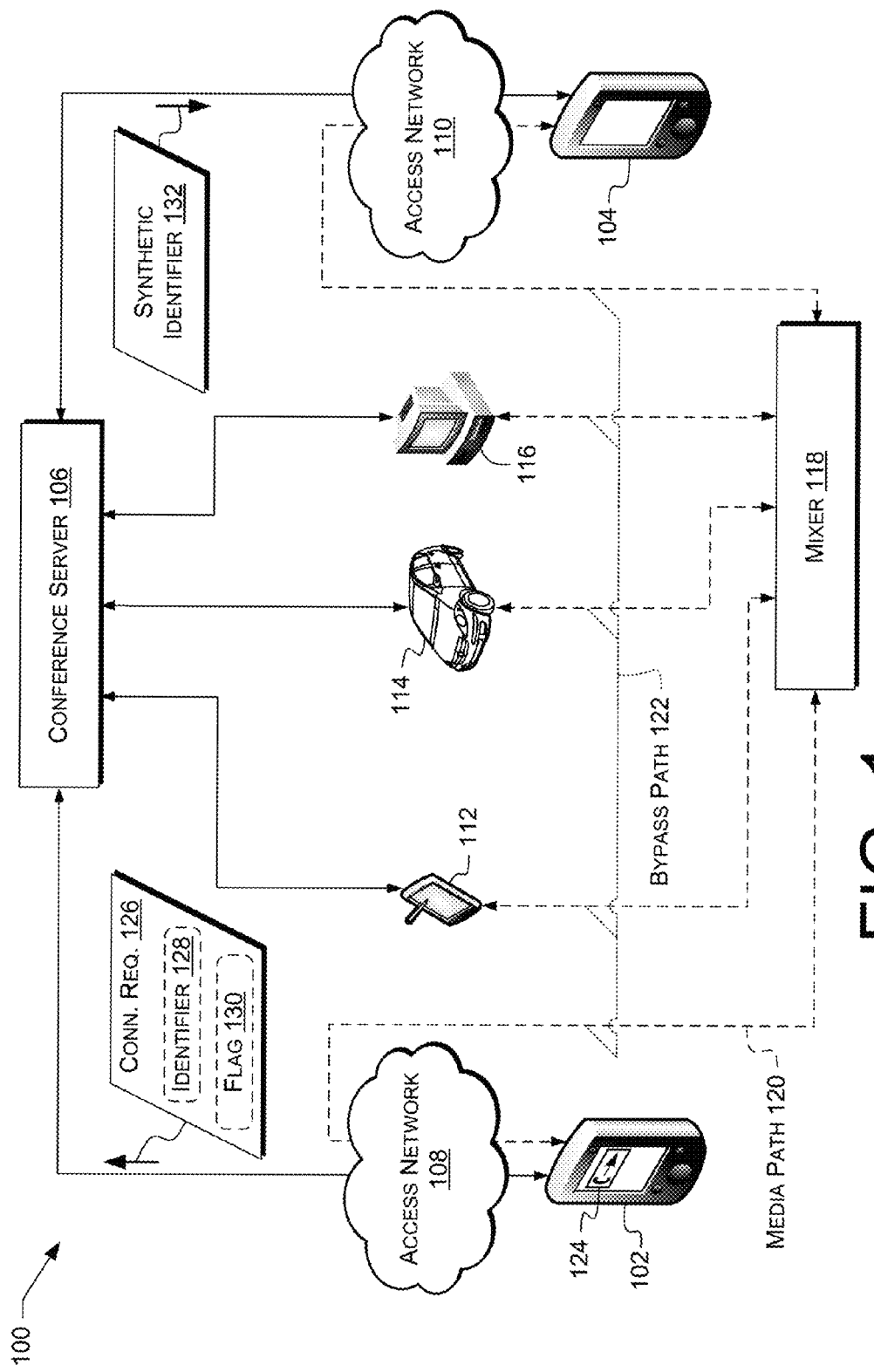
FIG. 1 is a block diagram illustrating a system for implementing teleconferencing according to some implementations.

Systems and techniques described herein permit teleconference servers and teleconference hosts to distinguish individual users participating in a teleconference, even when caller identification (ID) or other information about the identity of a caller is unknown or duplicates information about the identity of a different caller. For example, callers dialing via a Private Branch Exchange (PBX) system may have their caller ID blocked, or may have the same caller ID information as one or more other callers dialing via the same PBX. Systems and techniques herein permit teleconference servers to distinguish or individually identify such parties, e.g., without requiring a user to manually provide identification information. In some examples, teleconferences are facilitated transparently to the intercommunicating terminals.

The terms "call," "session," and "communication session" as used herein refer to a communications paths for bidirectional exchange of data among two or more computing devices, e.g., Voice over Long Term Evolution (VoLTE) mobile phones. Example sessions include voice and video calls, e.g., by which two or more human beings converse; data communication sessions, e.g., between two electronic systems or between an electronic system and a human being; or Rich Communication Services (RCS, also known as JOYN) sessions. As used herein, "terminal" refers to any computing device usable to participate in a teleconference. As used herein, a "party" is a terminal or a user employing a terminal. As used herein, "teleconference" refers to any communication session in which at least one party may transmit data to, or receive data from, more than one other party.

As used herein, "teleconference server" refers to any telecommunications network device configured to manage participants in a teleconference, e.g., by accepting requests to join the teleconference and establishing appropriate media-routing paths. An example of a teleconference server is an application server (AS) implementing the functions of a conference focus as defined in 3GPP TS 24.147 v12.5.0 Release 12 ("24.147"), e.g., §5.2.3. Another example of a teleconference server is a notification server including information of rules for determining party-specific synthetic identifiers (PSSIs), as discussed below. Other examples of teleconference servers can include mixers, low-level conference focuses, or other devices involved in teleconferencing, e.g., as set forth in 24.147 §4.

"Teleconference host," as used herein, refers to any party having sufficient access to a teleconference server to control one or more functions or properties of a teleconference facilitated by that teleconference server. In some examples, teleconference hosts can add parties to the teleconference, remove parties from the teleconference, mute and unmute individual parties, group or ungroup parties, control which party has the floor, broadcast system messages to one or more parties, join multiple teleconferences into a single teleconference, or separate a teleconference into multiple teleconferences. Teleconference policy information, e.g., stored by the conference server, can be used to determine how any teleconference participant (e.g., the teleconference host) may interact with any other teleconference participant.

Each party participating in a teleconference is either a "self-specified" or a "non-self-specified" party. As used herein, the term "non-self-specified party" refers to any party for which identification information specifically distinguishing that party from all other parties on the teleconference is not provided by the party or other network elements involved in the communication session between the party and the teleconference server. For example, a non-self-specified party can be any party for which caller ID or other identification information is missing, unreliable, or wholly or partly duplicative of identification information of another party (self-specified or non-self-specified) participating in a teleconference with that non-self-specified party. In some examples, a self-specified party can include a party for which caller ID information was provided and is unique within the teleconference. A party can concurrently be a self-specified party in one teleconference and a non-self-specified-party in another teleconference.

Example networks carrying sessions include second-generation (2G) cellular networks such as the Global System for Mobile Communications (GSM) and third-generation (3G) cellular networks such as the Universal Mobile Telecommunications System (UMTS). Other example networks include fourth-generation (4G) cellular networks, such as Long Term Evolution (LTE) carrying VoLTE sessions using Session Initiation Protocol (SIP) signaling, the public switched telephone network (PSTN) using Signaling System 7 (SS7) signaling, and data networks, such as Institute of Electrical and Electronics Engineers (IEEE) 802.11 ("WIFI") networks carrying voice over Internet Protocol (VoIP) calls or other over-the-top (OTT) sessions encapsulating, e.g., voice or video data in a way transparent to an underlying packet transport. Many networks are "heterogeneous networks," i.e., networks including devices with various sets of capabilities. For example, many LTE cellular networks support voice over LTE (VoLTE) and also interconnect with the PSTN.

In some examples, a teleconference server can receive a connection request corresponding to a party, determine that the party is a non-self-specified party in a specified teleconference, and determine a party-specific synthetic identifier (PSSI) for the party. In some examples, a telecommunications network can include terminals and a teleconference server configured to receive one or more connection requests corresponding to respective parties, determine that one or more of the parties are non-self-specified parties, and determine respective PSSIs for at least some of the non-self-specified parties. In some examples, a connection request corresponding to a party can be received. The connection request can specify a teleconference. A PSSI for the party can be determined, e.g., after determining that the party is a non-self-specified party in the specified teleconference. Various examples permit non-self-specified users to fully participate in and interact with teleconference hosts.

In some prior schemes, for example, if multiple anonymous callers with caller-id hidden call a particular user who merges them to create a teleconference, those anonymous callers do not have unique identification. For example, those anonymous callers may have the same SIP From addresses and From tags. If the particular user (e.g., the teleconference host) later wants to drop (remove from the conference) only a specific one of the anonymous callers, that user cannot do so as a drop request for one anonymous caller in such a scheme will drop the all of the anonymous caller participants in the teleconference. In contrast, various aspects herein determine PSSIs for non-self-specified parties, permitting individual non-self-specified parties to be removed from a teleconference, transferred in or out of a teleconference, designated as the recipient of a private message, or in other ways interacted with as if they were self-specified parties.

Throughout this disclosure, XPath syntax is used to refer to elements of Extensible Markup Language (XML) documents. For example, "|" separates parent and child nodes, "//" stands for any sequence of zero or more nodes in respective parent/child relationship, an "@" prefix designates elements, and square brackets delimit conditions. XML namespaces are omitted for brevity in XML samples and XPath expressions. SIP requests are specified in upper-case letters. SIP responses (e.g., "200 OK") are specified by their three-digit status code (e.g., "200") and optionally a representative, nonlimiting reason phrase (e.g., "OK"). A SIP response code ending in "xx", e.g., a SIP 1xx Provisional response, signifies any response of that numbered class, e.g., class 1, of SIP responses (RFC 3261, §7.2).

FIG. 1 is a block diagram illustrating a telecommunication system 100 according to some examples. The system includes computing devices 102 and 104, e.g., user equipment or other mobile phones, communications devices, or terminals. The computing devices 102 and 104 can be operated, e.g., by a user and a second user respectively (not shown). The computing devices 102 and 104 can be communicatively connected to one or more teleconference server(s) 106, e.g., via respective access networks 108 and 110. The teleconference server(s) 106 can include, e.g., an application server (AS) of an Internet Protocol (IP) Multimedia Subsystem (IMS) in a VoLTE-capable network.

For illustration only, there are shown additional terminals 112 (graphically represented as a personal digital assistant, PDA), 114 (graphically represented as an automobile, which may include a hands-free telephone system), and 116 (graphically represented as a desktop computer), any of which may include or be connected with a microphone, speakers, camera, display, or other audio or visual teleconferencing peripherals. Terminals 112, 114, or 116 can be communicatively connected with teleconference server 106 via one or more access network(s) (omitted for brevity).

Any of computing devices 102, 104 or terminals 112, 114, or 116 can, e.g., exchange teleconference information, join or leave a teleconference, or administer or host a teleconference via connections to teleconference server 106. Any of computing devices 102, 104 or terminals 112, 114, or 116 can also be communicatively connected to exchange media data of a teleconference, e.g., audio or video. This communicative connection can be made via respective communication links to a mixer 118, e.g., in a Media Resource Function Processor (MRFP) of an IMS. These connections are represented as media paths 120. Communicative connections can additionally or alternatively be made directly between individual devices or terminals participating in a teleconference, using, e.g., unicast or multicast links. This is represented graphically as bypass path 122.

The computing devices 102 and 104 (and terminals 112, 114, or 116, and likewise throughout) may be implemented as any suitable mobile computing devices configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, and/or similar mobile devices. Although this description predominantly describes the computing devices 102 and 104 as being "mobile" or "wireless," (e.g., configured to be carried and moved around), it is to be appreciated that the computing devices 102 and 104 may represent various types of communication devices that are generally stationary as well, such as televisions, desktop computers, game consoles, set top boxes, and the like. In this sense, the terms "communication device," "wireless device," "wireline device," "mobile device," "computing device," "user equipment," "UE," and "terminal" may be used interchangeably herein to describe any communication or computing device capable of performing techniques described herein with respect to, e.g., computing devices 102 and 104.

When the user desires to join a teleconference, the computing device 102, e.g., in response to actuation by the user of a "Send" user interface control 124, transmits a connection request 126 of a communication session. The connection request can, e.g., specify, identify, or otherwise correspond to a teleconference. The computing device 102 is an example of a session-originating device, i.e., a computing device initiating a communication session with another computing device. Session-originating devices can include user equipment or other telecommunications or computing devices communicatively connectable with other computing devices via one or more teleconference server(s) 106. Mobile phones and copper-loop PSTN phones can be examples of session-originating devices.

The teleconference server 106 can accept the connection request 126, e.g., by sending a SIP 200 OK response to the computing device 102. Call initiation can be performed, e.g., as defined in the Global System for Mobile (GSM) or voice-over-Long Term Evolution (VoLTE) standards, and can include the exchange of additional messages (not shown) between the computing device 102 and the teleconference server(s) 106. After computing devices 102 and 104 join the teleconference, media data of the teleconference, such as audio data or video data, can be exchanged between computing devices 102 and 104 via, e.g., media path 120 or bypass path 122.

The connection request 126, e.g., to teleconference server 106, can correspond to a party, e.g., computing device 102 or a user thereof. For brevity and without limitation, that party is referred to herein as the "first party." The first party may or may not be the party transmitting the connection request 126. The connection request 126 can include an identifier 128 of the first party. The identifier can include, e.g., a name, a Mobile Station International Subscriber Directory Number (MSISDN), a SIP Uniform Resource Identifier (URI), or other identification information of the first party. If a party is uniquely identified within a teleconference by an identifier 128 in the connection request 126, that party is a self-specified party within that teleconference as defined herein.

In some examples, the identifier 128 can include an "anonymous" identifier 128, a request for anonymity such as an 'anonymize="true"' flag, an identifier 128 that duplicates the identifier of another party in the teleconference, or no identifier 128. In such circumstances, the party corresponding to the connection request 126, e.g., the first party, is a non-self-specified party as defined herein.

In some examples, the connection request 126 can include a flag 130 indicating, e.g., privacy preferences of the user of computing device 102. Flag 130 can include, e.g., a request for anonymity such as a "Privacy: id" SIP header as defined in RFC 3325. In such circumstances, the party corresponding to the connection request 126, e.g., the first party, is a non-self-specified party as defined herein. Lack of a flag 130 can be expressed, e.g., by absence of a "Privacy" header, or by presence of a "Privacy: none" header as defined in RFC 3323.

In some examples, the teleconference server 106 can determine a party-specific synthetic identifier (PSSI) 132 for the first party or another non-self-specified party in a teleconference. The teleconference server 106 can transmit information of the PSSI 132, e.g., to computing device 102, to computing device 104, or to one or more parties participating in the teleconference. The PSSI 132 can be used to unambiguously refer to the corresponding non-self-specified party. Assigning PSSIs 132 can permit teleconference hosts or other parties in a teleconference to refer to or communicate with specific parties in the teleconference, even if those parties are non-self-specified parties.

As noted above, the connection request 126 and the identifier 128 (if included) can relate to computing device 102 or a user using computing device 102. The connection request 126 and the identifier 128 (if included) can alternatively relate to a party not associated with computing device 102. For example, a teleconference host using computing device 102 can transmit a SIP INVITE including an "application/resource-lists+xml" body listing one or more parties that should be invited to the teleconference. As used herein, a connection request 126 corresponds to each party listed therein. For example, such a body, e.g., in a SIP INVITE or SIP REFER request, can include multiple "/resource-lists/list/entry" items, each with a "uri" attribute designating a party. Such a connection request 126 can correspond to each party identified in such a body.

Figure 2:
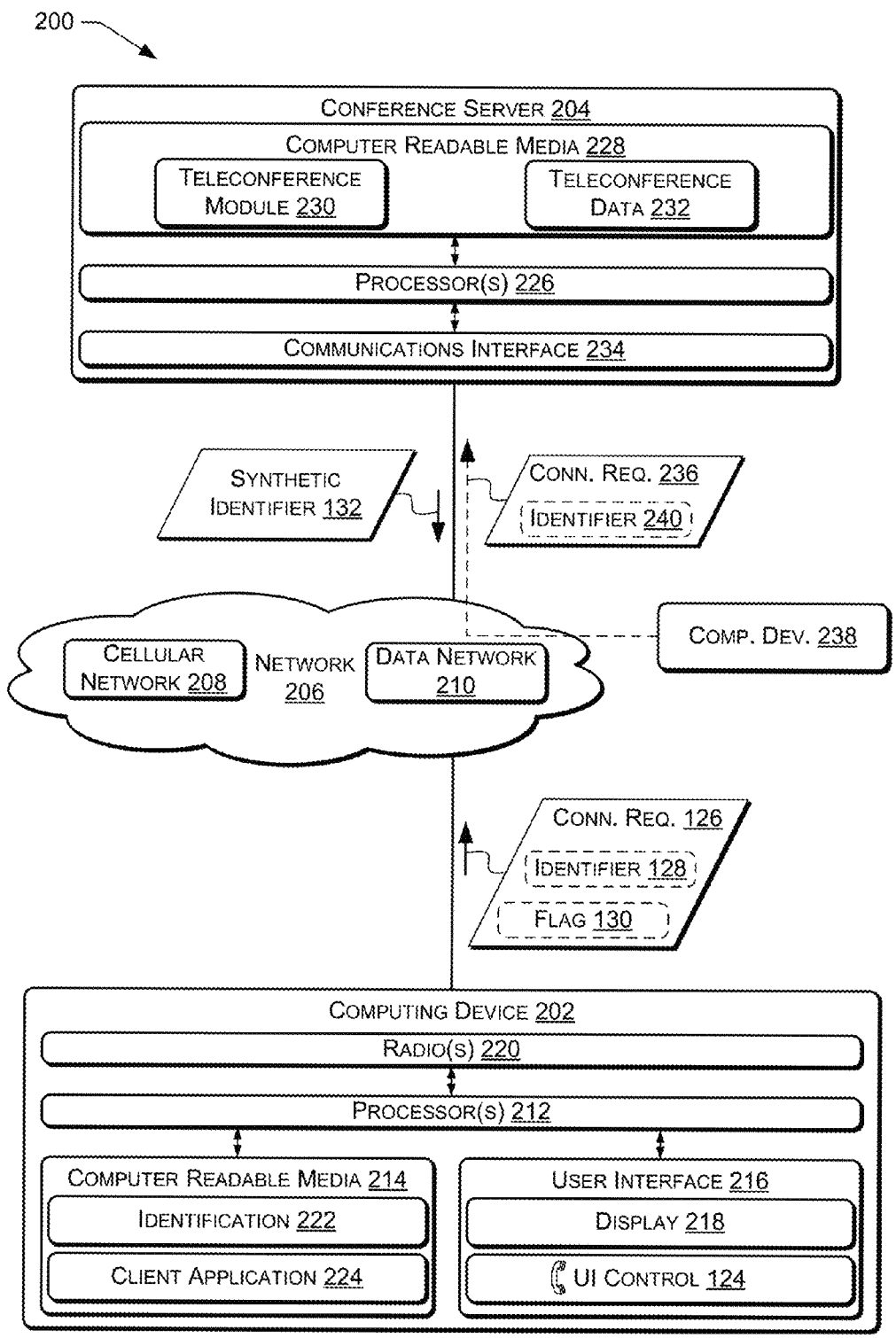
FIG. 2 is a block diagram illustrating a system, and components thereof, for implementing teleconferencing according to some implementations.

FIG. 2 is a block diagram illustrating a system 200 permitting synthetic-identifier determination according to some implementations. The system 200 includes a computing device 202, e.g., a wireless phone or other user equipment or terminal(s) such as computing device 102 or 104, FIG. 1, coupled to a teleconference server 204 via a network 206. The teleconference server 204 is an example of the teleconference server 106, FIG. 1, e.g., a teleconferencing application server or notification server. In some examples, the computing device 202 can include a media gateway (MGW), media gateway control function (MGCF), interworking function (IWF), or other device configured to bridge traffic. For example, computing device 202 can communicate via network 206 on behalf of a PSTN phone.

The network 206 can include one or more networks, such as a cellular network 208 and a data network 210. The network 206 can include one or more core network(s) connected to user equipment via one or more access network(s). Example access networks include LTE, WIFI, GSM Enhanced Data GSM Environment (EDGE) Radio Access Network (GERAN), UMTS Terrestrial Radio Access Network (UTRAN), and other cellular access networks or other access networks supporting, e.g., SIP signaling.

The cellular network 208 can provide wide-area wireless coverage using a technology such as GSM, Code Division Multiple Access (CDMA), UMTS, LTE, or the like. Example networks include Time Division Multiple Access (TDMA), Evolution-Data Optimized (EVDO), Advanced LTE (LTE+), Generic Access Network (GAN), Unlicensed Mobile Access (UMA), Orthogonal Frequency Division Multiple Access (OFDM), General Packet Radio Service (GPRS), EDGE, Advanced Mobile Phone System (AMPS), High Speed Packet Access (HSPA), evolved HSPA (HSPA+), VoIP, VoLTE, and/or any future IP-based network technology or evolution of an existing Internet Protocol (IP)-based network technology. Communications between the teleconference server 204 and computing devices such as the computing device 202 can additionally or alternatively be performed using other technologies, such as wired technologies (PSTN lines), optical technologies (e.g., Synchronous Optical NETwork, SONET) technologies, and the like.

The data network 210 can include various types of networks for transmitting and receiving data (e.g., data packets), including networks using technologies such as IEEE 802.1x protocols, WIFI, IEEE 802.15.1 ("BLUETOOTH"), Asynchronous Transfer Mode (ATM), WIMAX, and other network technologies, e.g., configured to transport IP packets. In some examples, the teleconference server 204 includes or is communicatively connected with an IWF or other device bridging networks, e.g., LTE, third-generation cellular (3G), and PSTN networks. In some examples, the teleconference server 204 or other core network device can bridge SS7 traffic from the PSTN into the network 206, e.g., permitting PSTN customers to place calls to cellular customers and vice versa.

In some examples, the cellular network 208 and the data network 210 can carry voice or data. For example, the data network 210 can carry voice traffic using Voice over Internet Protocol (VoIP) or other technologies as well as data traffic, or the cellular network 208 can carry data packets using High Speed Packet Access (HSPA), LTE, or other technologies as well as voice traffic. Some cellular networks 208 carry both data and voice in a packet-switched format. For example, many LTE networks carry voice traffic in data packets according to the VoLTE standard. Various examples herein provide origination and termination of, e.g., carrier-grade voice calls on, e.g., circuit-switched (CS) networks 206 or mixed VoLTE/3G networks 206, and on computing devices 202 including original equipment manufacturer (OEM) handsets and non-OEM handsets.

The computing device 202 can be or include a wireless phone, a wired phone, a tablet computer, a laptop computer, a wristwatch, or other type of computing device. The computing device 202 can include one or more processors 212, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs), and one or more computer readable media 214, such as memory (e.g., random access memory (RAM), solid state drives (SSDs), or the like), disk drives (e.g., platter-based hard drives), another type of computer-readable media, or any combination thereof. The computing device 202 can further include a user interface (UI) 216, e.g., including an electronic display device 218, a speaker, a vibration unit, a touchscreen, or other devices for presenting information to a user and receiving commands from the user. The user interface 216 can include a user interface control 124, e.g., a touchscreen button, to indicate a connection should be established to a teleconference. The user interface 216 or components thereof, e.g., the display 218, can be separate from the computing device 202 or integrated (e.g., as illustrated in FIG. 1) with the computing device 202. The computing device 202 can further include one or more radio(s) 220 configured to selectively communicate wirelessly via the network 206, e.g., via an access network 108 or 110 (both FIG. 1), or one or more transceivers (not shown) configured to selectively communicate using wired connections via the network 206.

The computer readable media 214 can be used to store data and to store instructions that are executable by the processors 212 to perform various functions as described herein. The computer readable media 214 can store various types of instructions and data, such as an operating system, device drivers, etc. The processor-executable instructions can be executed by the processors 212 to perform various functions described herein.

The computer readable media 214 can be or include computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information and which can be accessed by the processors 226. Tangible computer-readable media can include volatile and nonvolatile, removable and non-removable media implemented in any method or technology for storage of information, such as computer readable instructions, data structures, program modules, or other data.

The computer readable media 214 can store identification information 222 of the computing device 202. The identification information 222 can include, e.g., a MSISDN, IMSI, or other information stored on a Subscriber Identity Module (SIM card) of the computing device 202.

The computer readable media 214 can include processor-executable instructions of a client application 224. The client application 224, e.g., a native or other dialer, can permit a user to originate and terminate communication sessions associated with the computing device 202. The client application 224 can additionally or alternatively permit computing device 202 or a user thereof to join, withdraw from, host, locate, establish, terminate, or otherwise control or participate in teleconferences. Any particular client application 224 may carry out only some of these functions, e.g., by permitting joining and withdrawing from a teleconference but not permitting hosting a teleconference.

In some examples, the computing device 202, e.g., using client application 224, can transmit the connection request 126 indicating the identifier 128 to the teleconference server 204. The identifier 128 can include or be determined based at least in part on the identification information 222. The connection request 126 can additionally include a flag 130 as discussed above with reference to FIG. 1. The teleconference server 204 can receive, from the computing device 202 or other session-originating device, the connection request 126. The connection request 126 can be transmitted via, e.g., a SIP INVITE request or an HTTP request such as a GET to a Web Services or Representational State Transfer (REST) application programming interface (API) endpoint.

The teleconference server 204 can include one or more processors 226 and one or more computer readable media 228. The computer readable media 228 can be used to store processor-executable instructions of one or more components, e.g., a teleconference module 230. The processor-executable instructions can be executed by the processors 226 to perform various functions described herein. The computer-readable media 228 can also include teleconference data 232. Teleconference data 232 can include data of one or more teleconference(s) scheduled, in progress, or past. The data can include, e.g., identifications or other indications, e.g., SIP URIs, of participants, metadata such as teleconference title or teleconference-room location, or recordings or other records of the teleconference.

The teleconference server 204 can include a communications interface 234 permitting communications between processors 226 and network 206. In some examples, the communications interface 234 can include one or more radios, transceivers, or other communications components discussed herein. In some examples, the teleconference server 204 can include one or more components, e.g., teleconference module 230, communicatively coupled to the communications interface 234 and operated by the processor 226 to perform operations described below.

In some examples, teleconference module 230 (or other components of teleconference server 204, and likewise throughout) is operable by processor 226 to receive connection request 126, e.g., a SIP INVITE or REFER, via the communications interface 234. Connection request 126 can correspond to a party, e.g., a particular user or terminal, referred to for brevity as the "first party," as noted above. The connection request can specify a teleconference. In some examples, the connection request can include a SIP URI of a teleconference already in progress. In some examples, the connection request can include a SIP URI of a teleconference factory. Such connection requests can be used to establish a new teleconference. The teleconference factory can respond with a teleconference URI of the new teleconference, e.g., in a Contact header of a SIP 2xx response.

The teleconference module 230, upon receiving connection request 126 corresponding to the first party, can determine that the first party is a non-self-specified party in the specified teleconference. For example, the teleconference module 230 can make this determination based on absence of identifier 128 from connection request 126, based on identifier 128 corresponding to blocked caller-ID information or other withheld identification, based on a flag 130 in the connection request 126, or based on a match between identifier 128 and an identifier, e.g., stored in the teleconference data 232, of another party to the teleconference.

In some examples, identifier 128 for a party whose caller ID information is blocked may have the form, e.g., '"Anonymous"<sip:anonymous@anonymous.invalid>'. These or other forms of identifier 128, or connection requests 126 lacking identifiers 128, can correspond to non-self-specified parties, as discussed above.

In some examples, the connection request 126 may include requests to anonymize parties. For example, a connection request 126 including an "application/resource-lists+xml" body can specify one or more parties, as noted above. Any party matching '/resource-lists/list/entry [@anonymize="true"]' is considered a non-self-specified party, since identification information of that party is intended by the sender of the connection request 126 to be concealed.

In other examples of requests to anonymize parties, the identifier 128 can include a SIP "P-Asserted-Identity" header as defined in RFC 3325. The identifier 128 can be accompanied in the connection request by a flag 130, e.g., a SIP "Privacy: id" header or another indication requesting that ID information be blocked. In response to the flag 130, a proxy server (omitted for brevity) or other element of the network 206 can, before forwarding the connection request 126 to the conference server 204, remove the identifier 128 from the connection request, or replace the identifier 128 with, e.g., an "anonymous.invalid" address such as noted above.

In some examples, multiple parties may connect to a teleconference with the same identifier 128. For example, two parties using phones connected to the PSTN through a single PBX may have as identifier 128 the caller ID information of the PBX's outgoing line. Such parties, or any such party after the first to connect to the teleconference, can be non-self-specified parties.

In some examples, teleconference module 230 can determine a party-specific synthetic identifier (PSSI) 132 ("synthetic identifier") for a non-self-specified party to which connection request 126 corresponds, e.g., a non-self-specified first party. The PSSI 132 can be used, e.g., by teleconference hosts, to refer to or designate specific non-self-specified parties. In some examples, the teleconference server 204 can transmit the PSSI 132 or information thereof via the communications interface 234.

In some examples, teleconference module 230 is configured to provide a sequence of unique identifiers, e.g., numeric or string values. For example, teleconference module 230 can maintain, e.g., in teleconference data 232, a counter incremented and copied each time a unique identifier is required. In another example, teleconference module 230 can be configured to produce Globally Unique Identifiers (GUIDs) upon request.

In these and other examples, teleconference module 230 is configured to determine a unique identifier and determine the PSSI including the unique identifier and a synthetic-identification marker, e.g., "AnonymousX". For example, the synthetic-identification marker can include the text "anonymous" or a translation thereof (e.g., in German, "anonyme" or "ungenannt"). The synthetic-identification marker is not limited to words in human languages, and can alternatively or additionally include words in a constructed language, such as Klingon, or strings of text or symbols that do not form words.

In some examples, a unique identifier value v can be used to produce PSSIs of any of the forms shown in Table 1.

TABLE 1

| "AnonymousXv" <sip:anonymousXv@anonymous.invalid> |
| "AnonymousX" <sip:anonymousXv@anonymous.invalid> |
| "AnonymousXv" <sip:anonymousX@anonymous.invalid> |

For example, three successive PSSIs can include "anonymousX1", "anonymousX2", and "anonymousX3" for v=1, 2, 3.

In some examples, teleconference module 230 is configured to determine the PSSI by determining a name and a resource identifier. At least one of the name or the resource identifier can include a unique identifier. For example, the resource identifier can include a SIP URI, e.g., "<sip:alice@example.com>". In some examples, a PSSI can include a name, a URI, or (as shown in Table 1) both. Each PSSI can be distinguished from PSSIs of other parties in the teleconference by the name, the URI, or both. Three examples are shown in the three rows of Table 1. In some examples, the unique identifier and the synthetic-identification marker can both be in the name, they can both be in the resource identifier, or one can be in the name and the other in the resource identifier.

In some examples, teleconference module 230 is configured to receive a second connection request 236 corresponding to a second party via the communications interface. For example, a second computing device 238 can transmit second connection request 236 via network 206. In other examples, computing device 202 can transmit second connection request 236. The second party can be the same as the first party or can be a different party from the first party. Second connection request 236 can include a corresponding identifier 240 or not, e.g., as discussed above with reference to connection request 126. Second connection request 236 can additionally include a flag (omitted for brevity), e.g., as described herein with reference to flag 130.

The second connection request 236 can specify a teleconference, e.g., the same teleconference as specified in connection request 126. For example, connection request 126 and second connection request 236 can both be SIP INVITES to the same teleconference URI. In other examples, connection request 126 can be a SIP INVITE to a teleconference-factory URI. Teleconference server 204 can respond to connection request 126 with a SIP 200 OK response including a Contact header listing a teleconference URI with the "isfocus" feature tag. Second connection request 236 can be a SIP INVITE to the specified teleconference URI. In these examples, even though the SIP INVITES were sent two different URIs (connection request 126 to a teleconference factory URI and second connection request 236 to a teleconference URI), connection request 126 and second connection request 236 can specify the same teleconference.

In some examples, teleconference module 230 is configured to determine that the second party is a non-selfspecified party in the specified teleconference. This can be done as discussed above for the first party, e.g., based on the identifier 240 or the flag in the second connection request 236. In some examples, teleconference module 230 is configured to, e.g., in response to the determination, determine a second PSSI for the second party. In a specific nonlimiting example, teleconference module 230 determines the PSSI for the first party to be "AnonymousX1 <sip: anonymousX1@anonymous.invalid>" and determines the PSSI for the second party to be "AnonymousX2 <sip: anonymousX2@anonymous.invalid>".

In some examples, teleconference module 230 is configured to determine that the party and the second party correspond to a single handle. As used herein, a "handle" refers generally to any identifying information associated with a specific user. For example, a user may subscribe to a call-forwarding service that will receive calls to a single phone number, e.g., a single MSISDN. The call-forwarding service may then forward a received call to multiple devices, in parallel or sequentially. This can permit a user's home, work, and cellular phones to ring on an incoming call associated with the user's MSISDN, can permit the user to answer such calls from any of those phones. That MSISDN can serve as the user's handle in this example. Other examples of handles can include a user's real name or a portion thereof (e.g., given name), or a pseudonym selected by the user (e.g., an Internet Relay Chat, IRC, or demoscene handle, such as "SilentK").

Teleconference module 230 can be configured to determine that two or more parties in a teleconference correspond to a single handle, e.g., based on information carried in the connection requests 126, 236. For example, when two parties transmit connection requests with the same SIP "From" header, the two parties are non-self-specified parties since identification information specifically distinguishing the parties from each other is not provided. The "From" header value or a portion thereof, e.g., a URI, username, or friendly name, can serve as the handle. For example, the portion of a tel or SIP URI between the ":" and the "@" can serve as the handle.

In some examples, teleconference module 230 is configured to determine the respective PSSI for the first or second party based at least in part on the single handle and a handle-unique identifier. The handle-unique identifier can include any identification information (e.g., a number or UUID) that is unique for all parties in the teleconference that correspond to the same handle. In some examples, teleconference module 230 is configured to determine the PSSI for the second party based at least in part on the single handle and a second, different handle-unique identifier.

In an example, the first party and the second party both correspond to the handle "silvers". The teleconference module 230 can determine that the handle-unique identifiers are "1" and "2", respectively. Therefore, the teleconference module 230 can determine that the PSSI of the first party is "silvers_1" and the PSSI of the second party is "silvers_2".

Figure 3:
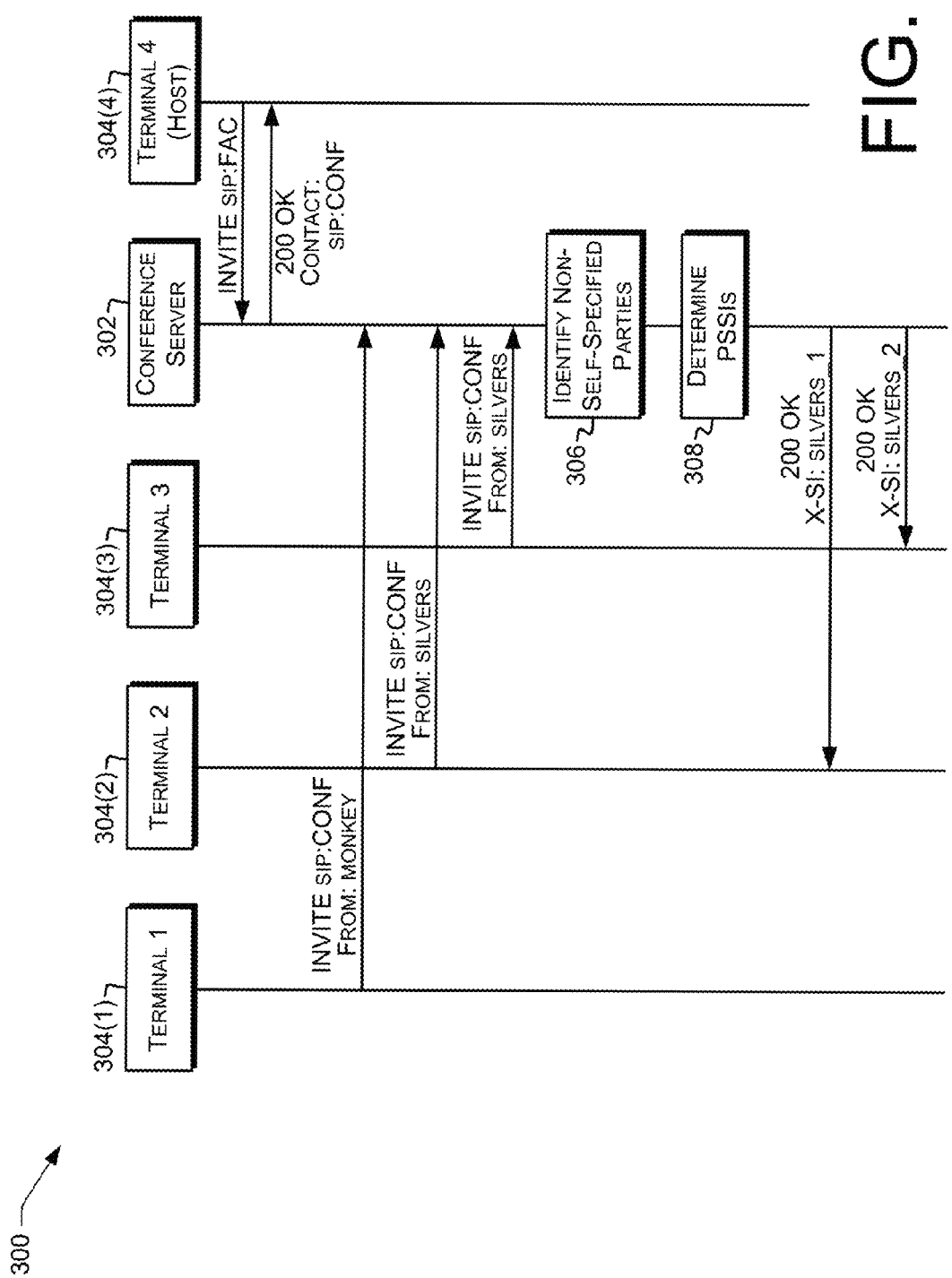
FIG. 3 shows a call flow illustrating nonlimiting example data exchanges while establishing a teleconference.

FIG. 3 shows a call flow 300 illustrating nonlimiting example exchanges in an example telecommunications network, e.g., before or during a teleconference. The session is conducted via teleconference server 302, which can represent teleconference server 106 or 204. The telecommunications network includes a plurality of terminals, illustrated as terminals 304(1)-304(N) (individually or collectively referred to herein with reference 304), N∈ℤ>1. The particular number of terminals shown is an example and is not limiting. Any of the terminals 304 can be any of the types of terminals or computing devices described above, e.g., with reference to computing devices 102, 104, or 202. Teleconference server 302 is communicatively connectable with the plurality of terminals 304. As used herein, "Tn" refers to terminal 304(n).

In the illustrated example, terminal 304(4) is the terminal used by the teleconference host. Terminal 304(4) sends a SIP INVITE specifying a teleconference factory URI represented for brevity as "sip:FAC". In response, teleconference server 302 sends the teleconference URI to terminal 304(4), e.g., in a "Contact" header of a SIP 200 OK response. In this example, the teleconference URI is represented as "sip: CONF".

In some examples, teleconference server 302 can be configured to receive, from individual ones of a plurality of terminals 304, one or more connection requests corresponding to one or more parties, e.g., respective parties. In the illustrated example, terminals 304(1)-304(3) are sending respective SIP INVITE connection requests to the established teleconference URI, "sip:CONF".

In some examples, at block 306, teleconference server 302 can determine that one or more of the parties are non-self-specified parties. In this example, terminal 304(1) is transmitting a connection request corresponding to a self-specified identified party with identification "monkey". Terminals 304(2) and 304(3) are transmitting connection requests corresponding to respective parties with identification "silvers". Accordingly, the parties identified as "silvers" are non-self-specified parties with respect to teleconference "sip:CONF".

In some examples, at block 308, teleconference server 302 can determine respective party-specific synthetic identifiers (PSSIs) for at least some of the non-self-specified parties. In an example, teleconference server 302 can determine PSSI "silvers_1" for terminal 304(2) and PSSI "silvers_2" for terminal 304(3).

In the illustrated example, teleconference server 302 transmits to terminals 304(2) and 304(2) information of the respective PSSI. In the illustrated example, the information is a copy of the PSSI transmitted as the value of an "X-SI" header in a SIP 200 OK response to the SIP INVITE. The information of the PSSI can additionally or alternatively be transferred in, e.g., a SIP INFO, MESSAGE, or NOTIFY request, or in similar fields of packets according to protocols other than SIP.

Figure 4:
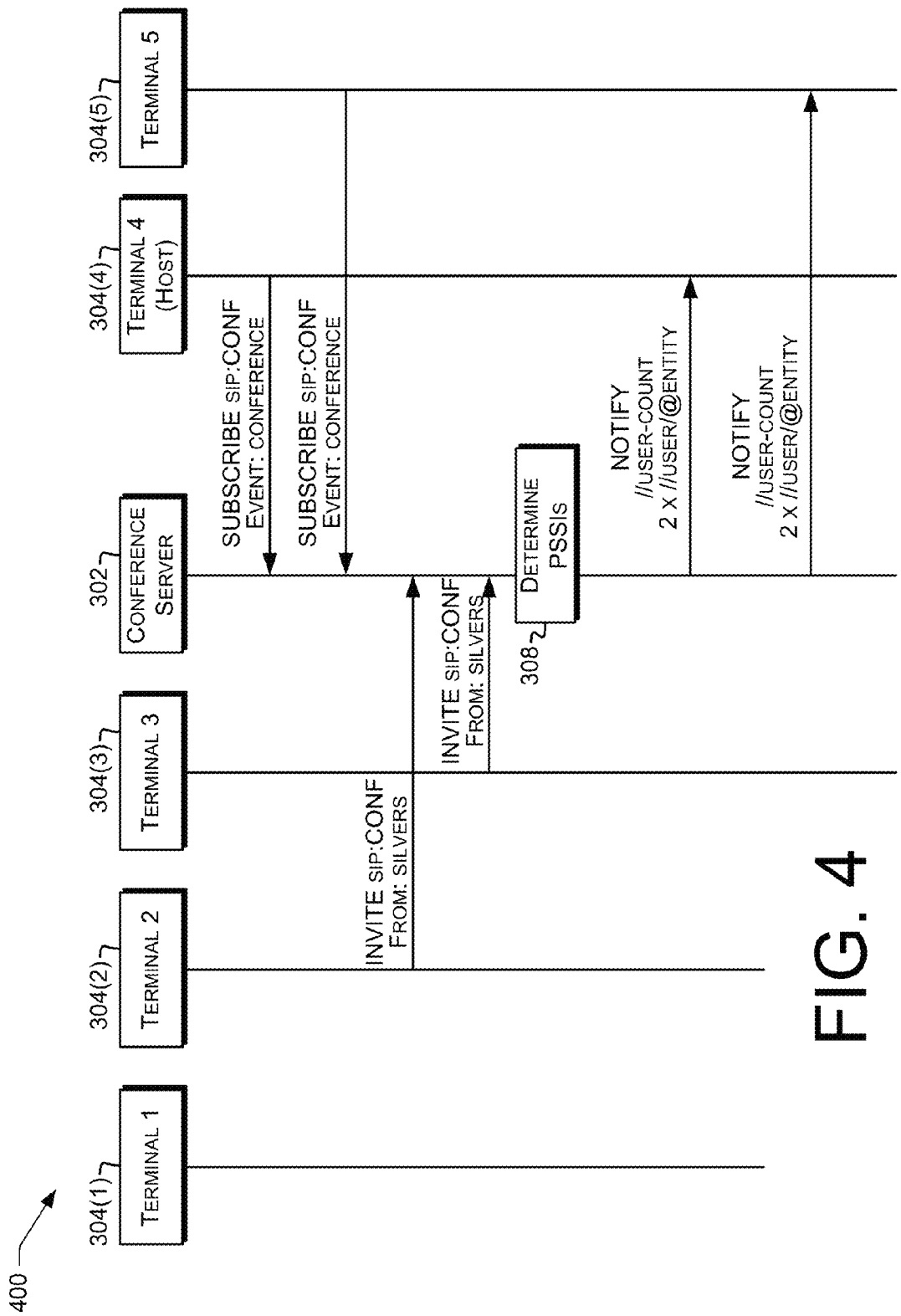
FIG. 4 shows a call flow illustrating nonlimiting example data exchanges useful for managing a teleconference.

FIG. 4 shows a call flow 400 illustrating nonlimiting example exchanges in an example telecommunications network, e.g., before or during a teleconference. Teleconference server 302 and terminals 304 are as discussed above with reference to FIG. 3.

In some examples, the teleconference server 302 is further configured to receive one or more subscription requests corresponding to respective subscribing parties of the parties. In the illustrated example, teleconference server 302 receives subscription requests from terminals 304(4) and 304(5). The subscription requests can be, e.g., SIP SUBSCRIBE requests according to the SIP teleconference event package of RFC 4575, e.g., sent to the teleconference URI.

In some examples, the teleconference server 302 is further configured to transmit notification messages to at least some of the subscribing parties in response to determining the PSSIs. Individual ones of the notification messages can include at least some of the determined PSSIs. In the illustrated example, terminals 304(2) and 304(3) subscribe as non-self-specified parties, and teleconference server 302 determines PSSIs at block 308, e.g., as discussed above with reference to FIG. 3.

In response to, or subsequent to, determining the PSSIs (block 308), teleconference server 302 sends SIP NOTIFY messages to subscribed terminals 304(4) and 304(5). The SIP NOTIFY messages in this example include "application/teleconference-info+xml" bodies with "/teleconference-info/teleconference-state/user-count" elements listing the number of users and "/teleconference-info/users/user" sub-nodes carrying the PSSIs. Example sub-nodes holding PSSI info can include, with <U> standing for "/teleconference-info/users/user", "<U>/@entity" attributes, "<U>/display-text" nodes, "<U>/associated-aors/uri" nodes, or "<U>/associated-aors/display-text" nodes. In the illustrated example, each NOTIFY body includes two new "//user/@entity" nodes, one for PSSI "silvers_1" and one for PSSI "silvers_2".

Figure 5:
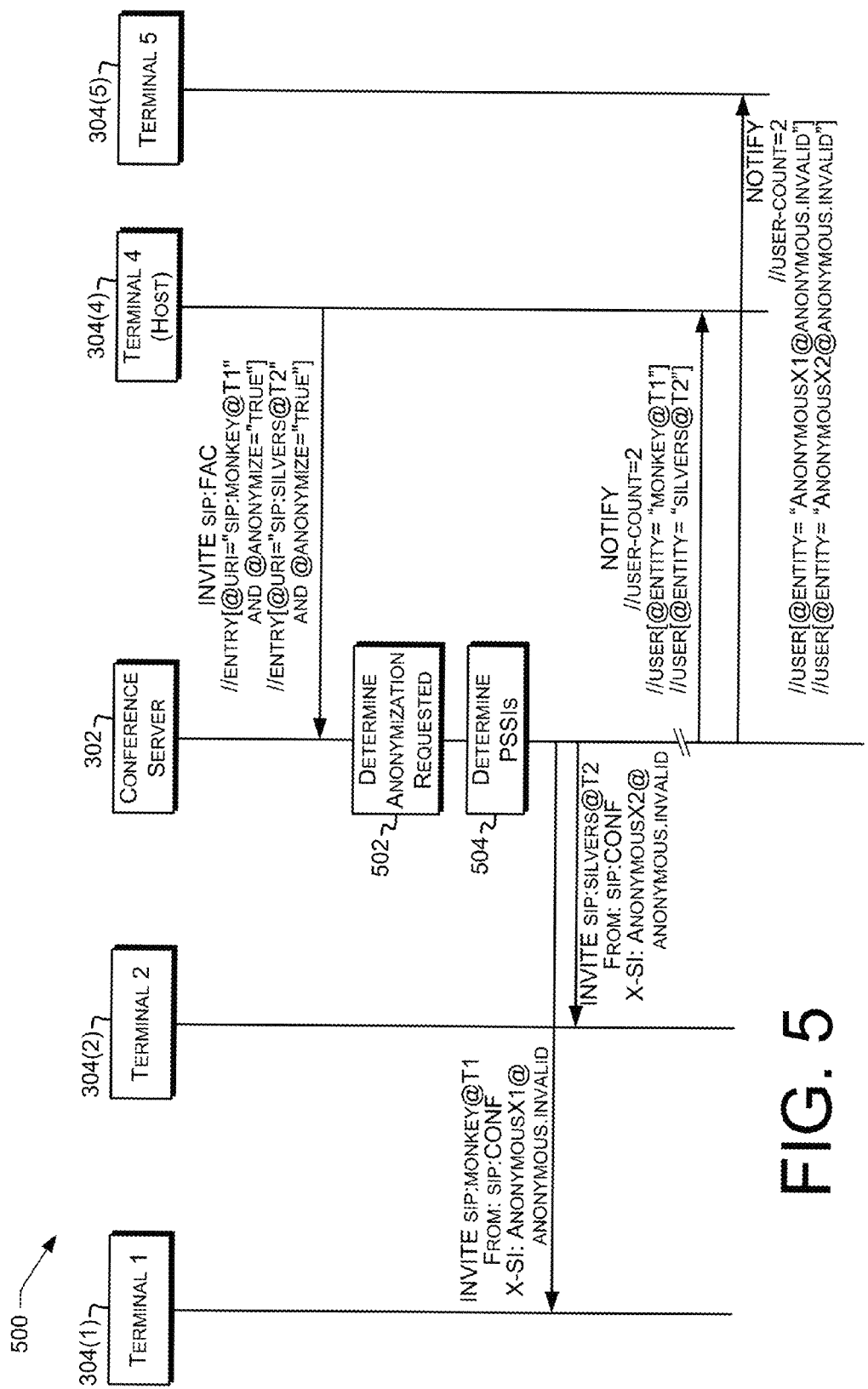
FIG. 5 shows a call flow illustrating nonlimiting example data exchanges while establishing a teleconference among a known set of parties.

FIG. 5 shows a call flow 500 illustrating nonlimiting example exchanges in an example telecommunications network, e.g., before or during a teleconference. Teleconference server 302 and terminals 304 are as discussed above with reference to FIG. 3.

In some examples, the teleconference server 302 is configured to receive an invitation request from one of the parties, the invitation identifying a teleconference and a party not participating in the teleconference. In the example of FIG. 5, the teleconference is identified by the sip:FAC teleconference factory URI, and the invitation request is a SIP INVITE from terminal 304(4) listing parties not participating in the teleconference (monkey@T1 and silvers@T2) in the "/resource-lists" body. In other examples, the invitation request can include a SIP REFER with a Refer-To header identifying the user to invite. In some of these examples, the Request-URI of the SIP REFER request can identify the teleconference. For example, a party can sent a "REFER sip:CONF" request with the header "Refer-To: <sip:silentk@T6;method=INVITE>" to invite party "silentk" from terminal 304(6) (omitted for brevity) to join the teleconference "sip:CONF".

In this example, terminal 304(4), on behalf of the teleconference host, sends, as a connection request, a SIP INVITE to the teleconference factory URL. The SIP INVITE corresponds to a first party using terminal 304(1) ("sip:monkey@T1") and a second party using terminal 304(2) ("sip:silvers@T2"). These URIs can be provided, e.g., in an "application/resource-lists+xml" body as noted above. In this example, terminal 304(3) is not in use, so monkey and silvers are both self-specified parties. In this example, the "application/resource-lists+xml" body includes a node matching '/resource-lists/list/entry[@uri="sip:monkey@T1" and @anonymize="true"]', indicating anonymization has been requested for monkey. Also in this example, the "application/resource-lists+xml" body includes a node matching '/resource-lists/list/entry[@uri="sip:silvers@T2" and @anonymize="true"]', indicating anonymization has been requested for silvers.

In some examples, at block 502 the teleconference server 302 is further configured to determine that anonymization has been requested for one or more self-specified parties of the parties. This can be done by checking for "//entry/@anonymize" attributes, as noted above. Anonymization can be requested for a given party by that party or by another party, e.g., the teleconference host.

In some examples, at block 504, in response to a determination in block 502, teleconference server 302 determines respective PSSIs for at least some of the one or more self-specified parties, e.g., for monkey@T1, silvers@T2, or both. In this examples, PSSI "AnonymousX1@anonymous.invalid" is determined for monkey@T1 and PSSI "AnonymousX2@anonymous.invalid" is determined for silvers@T2.

In some examples, in response to the received invitation request, the teleconference server 302 can transmit an invitation message to the party not participating in the teleconference. The invitation message can include, e.g., a SIP INVITE. In the example of FIG. 5, the SIP INVITE messages to terminals 304(1) and 304(2) can be sent in response to the SIP INVITE from terminal 304(4). Invitation requests and invitation messages can be sent by, sent to, or received by any combination of self-specified parties and non-self-specified parties, with or without requests for anonymization.

In some examples, teleconference server 302 can transmit SIP INVITE requests or other requests to the specified parties to invite those parties to join the teleconference. The illustrated INVITE requests to terminals 304(1) and 304(2) include the PSSIs in "X-SI" headers. After terminals 304(1) and 304(2) accept the invitations (e.g., with SIP 200 OK responses, omitted for brevity), teleconference server 302 can transmit SIP NOTIFY messages to subscribed terminals 304(4) and 304(5). In the illustrated example, the SIP NOTIFY to the teleconference host's terminal 304(4) includes the actual identities of the self-specified parties, in this example '//user[@entity="monkey@T1"]' and '//user[@entity="silvers@T2"]'. The SIP NOTIFY to terminal 304(5) includes the PSSIs, in this example '//user[@entity="AnonymousX1@anonymous.invalid"]' and '//user[@entity="AnonymousX2@anonymous.invalid"]'. A SIP NOTIFY can additionally or alternatively include both actual-identity information and PSSIs for one or more parties.

Figure 6:
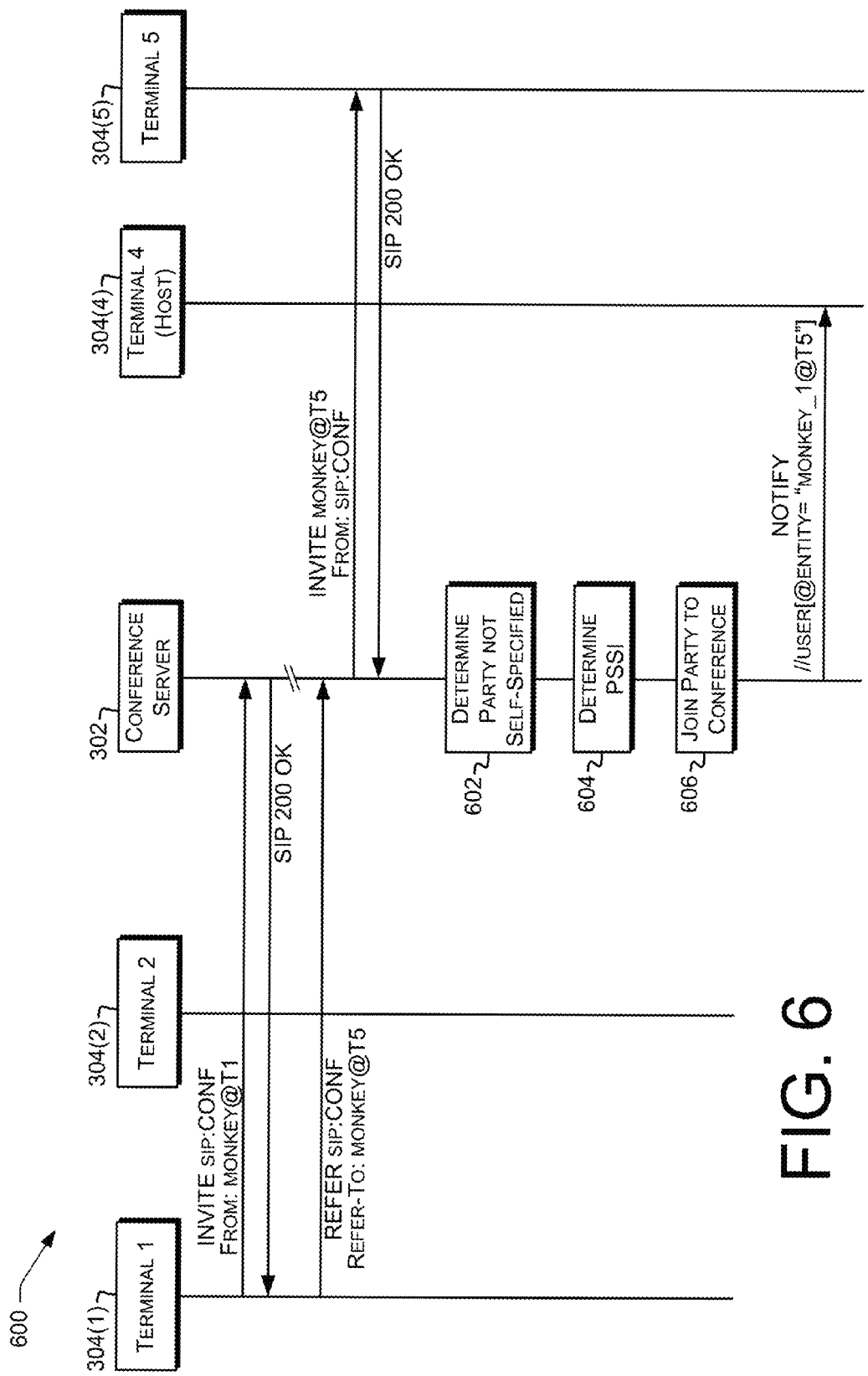
FIG. 6 shows a call flow illustrating nonlimiting example data exchanges for inviting parties to a teleconference.

FIG. 6 shows a call flow 600 illustrating nonlimiting example exchanges in an example telecommunications network, e.g., before or during a teleconference. Teleconference server 302 and terminals 304 are as discussed above with reference to FIG. 3. In this example, user monkey@T1 joins the teleconference by sending a SIP INVITE, to which teleconference server 302 responds with a SIP 200 OK response.

In the illustrated example, as discussed above with reference to FIG. 5, teleconference server 302 receives an invitation request and transmits an invitation message. In example shown in FIG. 6, the invitation request is a SIP REFER request from terminal 304(2) to the teleconference URI sip:CONF. The Refer-To header of the REFER specifies that "sip:monkey@T5" should be invited to teleconference "sip:CONF". The teleconference server 302 then sends the invitation message, in this example a SIP INVITE, to terminal 304(5) for invitation to user "monkey". In other examples not shown, terminal 304(1) can send a SIP REFER to terminal 304(5) with the header "Refer-To: sip:CONF", and terminal 304(5) can then send a SIP INVITE "From: monkey@T5" to teleconference server 302.

In some examples, teleconference server 302 is configured to receive an invitation response from the party not participating in the teleconference, in this example monkey@T5. For example, teleconference server 302 can receive a SIP 200 OK response from terminal 304(5).

In some examples, at block 602, teleconference server 302 is configured to determine, based at least in part on the invitation response, that the party not participating in the teleconference is a non-self-specified party. In this example, since user "monkey" is participating from terminal 304(1), when user "monkey" joins from terminal 304(5), user "monkey" is no longer self-specified. In this example, information provided by "monkey" is not sufficient to distinguish monkey@T1 from monkey@T5.

In some examples, at block 604, teleconference server 302 is configured to determine a PSSI for the party not participating in the teleconference in response to the determination that the party not participating in the teleconference (e.g., monkey@T5) is a non-self-specified party. For example, the PSSI can be "monkey_1" or "anonymousx1".

In some examples, at block 606, teleconference server 302 is configured to join the party not participating in the teleconference to the teleconference. In this example, teleconference server 302 further sends a SIP NOTIFY to the teleconference host on terminal 304(4) including information of the PSSI.

Figure 7:
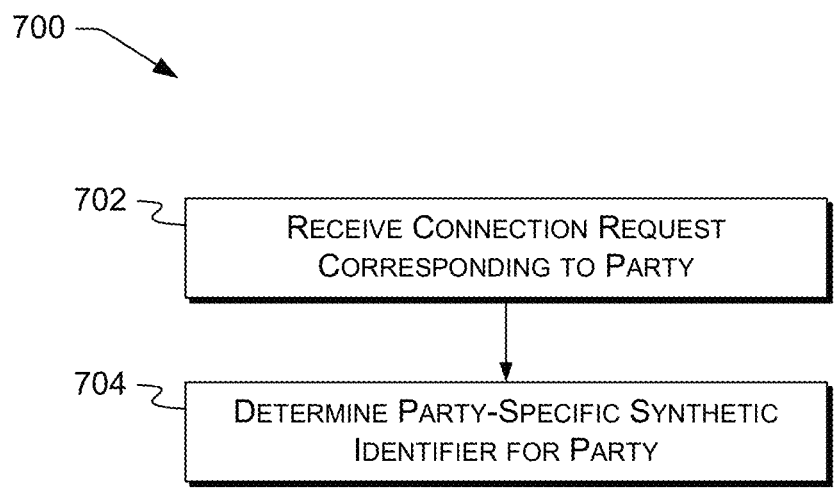
FIG. 7 illustrates an example process for operating a teleconference according to some implementations.

FIG. 7 illustrates an example process 700 for operating a teleconference performed, e.g., by a teleconference server, e.g., the teleconference server 204, FIG. 2, or the teleconference server 302, FIG. 3, communicatively connectable with UE, e.g., computing device 202, FIG. 2, of a telecommunication system 200 including a network 206. In some examples, the teleconference server 204 includes one or more processors 226 configured to perform operations described below, e.g., in response to computer program instructions of the teleconference module 230. Operations shown in FIGS. 7, 8A, and 8B, discussed below, can be performed in any order except when otherwise specified, or when data from an earlier step is used in a later step. For clarity of explanation, reference is herein made to various components and data exchanges shown in FIGS. 1-6 that can carry out or participate in the steps of the exemplary method. It should be noted, however, that other components can be used; that is, exemplary method(s) shown in FIGS. 7, 8A, and 8B are not limited to being carried out by the identified components.

At 702, the teleconference server 302, e.g., the processor 226, receives a connection request corresponding to a party. The connection request specifies a teleconference. This can be done, e.g., using a SIP INVITE or NOTIFY message, e.g., as described above with reference to FIG. 3.

At 704, the teleconference server 302 determines a PSSI for the party. This can be done, e.g., as described above with reference to block 308, FIG. 3.

Figure 8A:
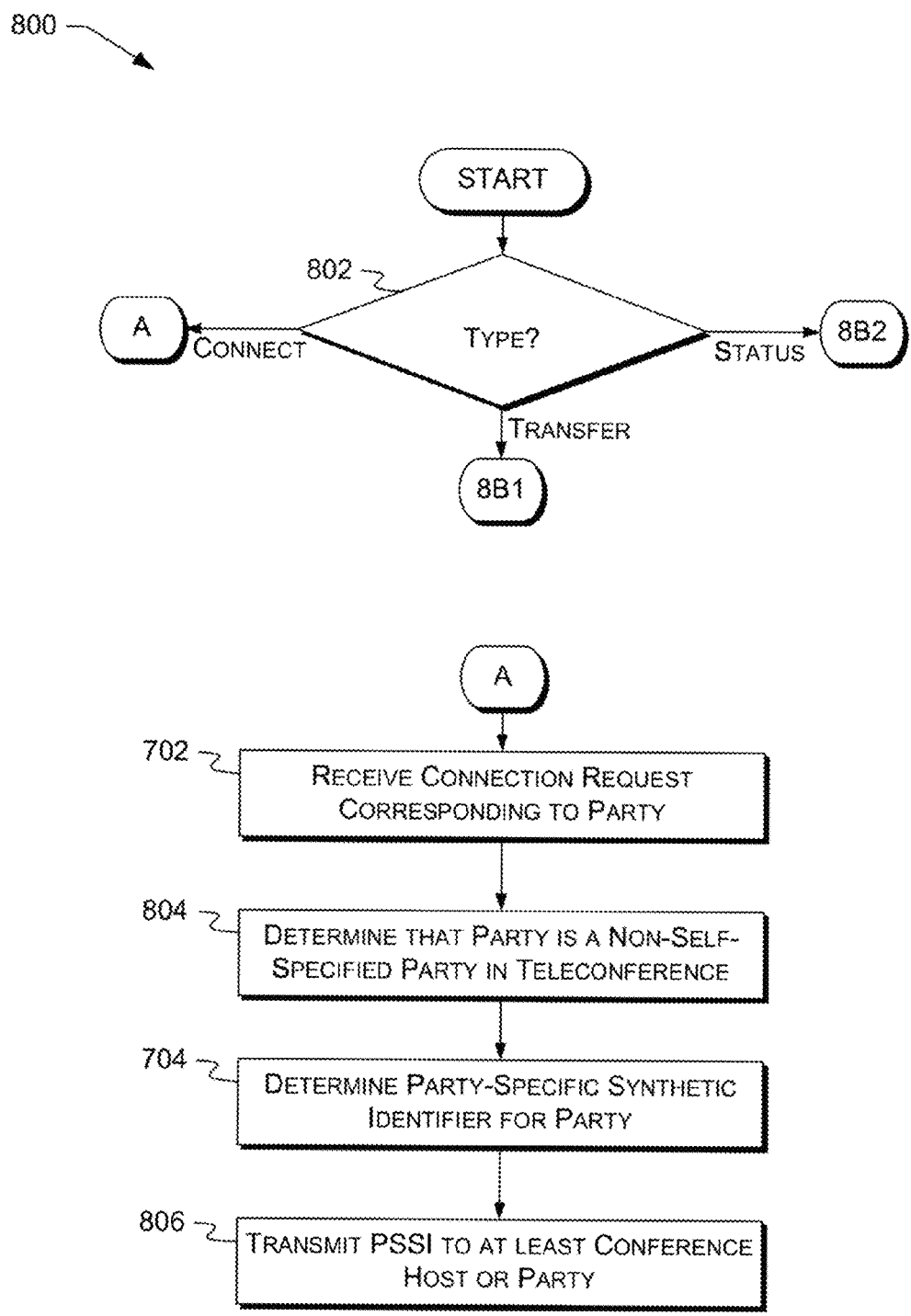
FIG. 8A illustrates example processes for operating a teleconference according to some implementations.
Figure 8B:
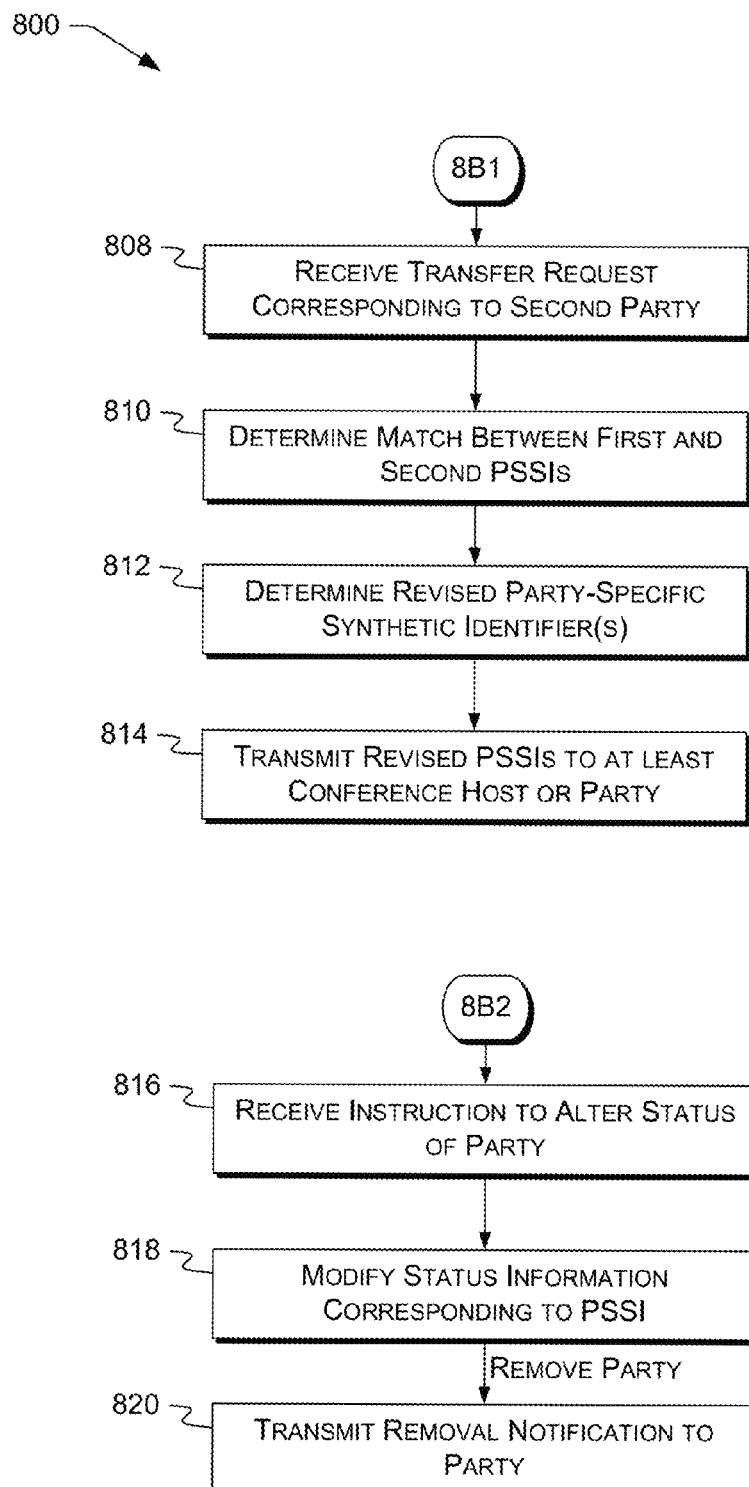
FIG. 8B illustrates example processes for operating a teleconference according to some implementations.

FIGS. 8A and 8B illustrate example processes 800 for operating a communication session. The processes can be performed, e.g., by a teleconference server, e.g., the teleconference server 204, FIG. 2, or the teleconference server 302, FIG. 3. Blocks 702 and 704 can be as discussed above with reference to FIG. 7. Processing can begin at block 802.

At 802, the teleconference server can receive a data transmission, e.g., of request or instruction packet(s), and determine a type of the data transmission. Depending on the type, block 802 can include or be followed by block 702, block 808 (FIG. 8B), or block 816 (FIG. 8B).

Referring to FIG. 8A, at 702, as discussed above, a connection request is received. Block 702 in this example can be followed by block 804.

At 804, prior to determining the PSSI at block 704, the teleconference server 302 can determine that the party is a non-self-specified party in the specified teleconference. This can be done, e.g., as described above with reference to block 306, FIG. 3, block 502, FIG. 5, or block 602, FIG. 6. Block 804 can be followed by block 704 in this example.

At 704, the PSSI can be determined as discussed above. Block 704 can be followed in this example by block 806.

At 806, after determining the PSSI at block 704, the teleconference server 302 can transmit the PSSI to at least a teleconference host or the party. This can be done, e.g., as described above with reference to the "X-SI" header in the SIP 200 OK responses shown in FIG. 3, or the SIP NOTIFY requests shown in FIGS. 4, 5, and 6.

Referring to FIG. 8B, at 808, the teleconference server 302 can receive a transfer request corresponding to a second party. The transfer request can include a second PSSI for the second party. For example, the transfer request can include a SIP INVITE or REFER identifying the teleconference. Transfer requests can be used, e.g., to merge two teleconferences. Transfer requests can be used to attach a call such as a conventional two-party call to a teleconference, so that both parties to the call join the teleconference and the call is terminated. In some examples, the second party, the party corresponding to the transfer request, is a non-self-specified party or has otherwise had a PSSI assigned. The transfer request can include that PSSI, e.g., in a SIP header or a message body. For example, the transfer request can include an application/resource-lists+xml body listing the party's PSSI in the corresponding "//entry/@uri" or "//entry/@x-si" node.

At 810, the teleconference server 302 can determine a match between the PSSI and the second PSSI. For example, the teleconference server 302 can perform a string comparison or a byte comparison of the PSSI and the second PSSI. The teleconference server 302 can handle variations of case and normalization of, e.g., UNICODE characters according to selected parameters or user preferences.

At 812, in response to the match (block 810), the teleconference server 302 can determine respective revised PSSI(s) for at least one of the party or the second party. For example, if the first PSSI and second PSSIs are "silentk", the teleconference server 302 can determine a revised PSSI of "silentk_1", a revised second PSSI of "silentk_1", or a revised PSSI of "silentk_1" and a revised second PSSI of "silentk_2". Similarly, "AnonymousXv" PSSIs such as shown in Table 1 can be revised by changing the value v.

At 814, the teleconference server 302 can transmit at least one of the revised PSSI(s) to at least a teleconference host or the at least one of the party or the second party. This permits the teleconference host or party or parties to make requests (e.g., to drop or transfer a party) based on the corresponding revised PSSI.

Still referring to FIG. 8B, at 816, the teleconference server 302 can receive an instruction to alter the status of a party participating in the teleconference. The request can include the PSSI. For example, to remove a non-self-specified participant from the teleconference, the teleconference host can transmit to the teleconference server 302 the instruction including a SIP REFER request with a Request-URI of the teleconference URI (e.g., sip:CONF) and a Refer-To specifying the PSSI and the parameter "method=BYE".

At 818, in response, to the received instruction, the teleconference server 302 can modify status information corresponding to the PSSI in a memory (e.g., computer-readable medium 228) communicatively connected with the processor 226. For example, the status information can be stored with or within teleconference data 232. In some examples, the status information can be modified by removing information of a party that is being removed from the teleconference.

At 820, in response to the instruction including an instruction to remove the party from the teleconference, the teleconference server 302 can transmit a removal notification to the party via a communications interface 234. For example, the removal notification can include a SIP BYE request or termination of a communication connection or session such as a TCP connection.

In some examples, providing party-specific synthetic identifiers (PSSIs) can permit unambiguously referring to participants in a teleconference without compromising anonymity or mistaking participants' identities. This can reduce bandwidth used in exchanging messages to determine which party should be the target of, e.g., an instance message or a removal or transfer out of a teleconference. Various examples include providing a user interface, e.g., a graphical interface, listing PSSIs of one or more non-self-specified parties participating in a teleconference and permitting operations such as those noted above to be carried out directly by reference to those PSSIs.

Example data transmissions in FIGS. 1 and 2, example data exchanges in the call flow diagrams of FIGS. 3-6, and example blocks in the process diagrams of FIGS. 7 and 8, represent one or more operations that can be implemented in hardware, software, or a combination thereof to transmit or receive described data or conduct described exchanges. In the context of software, the illustrated blocks and exchanges represent computer-executable instructions that, when executed by one or more processors, cause the processors to transmit or receive the recited data. Generally, computer-executable instructions, e.g., stored in program modules that define operating logic, include routines, programs, objects, modules, components, data structures, and the like that perform particular functions or implement particular abstract data types. Except as expressly set forth herein, the order in which the transmissions are described is not intended to be construed as a limitation, and any number of the described transmissions can be combined in any order and/or in parallel to implement the processes.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A teleconference server, comprising:
   a processor;
   a communications interface; and
   one or more components communicatively coupled to the communications interface and operated by the processor to perform operations including:
      receiving a connection request corresponding to a party via the communications interface, the connection request specifying a teleconference;
      determining that the party is a non-self-specified party in the specified teleconference responsive to the connection request not including caller identification information for the party, lacking reliable caller identification information for the party, or including caller identification information that is duplicative of caller identification information of another party participating in the teleconference; and
      in response, determining a party-specific synthetic identifier for the party.

2. The teleconference server of claim 1, wherein the one or more components are further operable by the processor to determine the party-specific synthetic identifier by:
   determining a unique identifier; and
   determining the party-specific synthetic identifier including the unique identifier and a synthetic-identification marker.

3. The teleconference server of claim 2, wherein the synthetic-identification marker includes the text "anonymous" or a translation thereof.

4. The teleconference server of claim 1, wherein the one or more components are further operable by the processor to determine the party-specific synthetic identifier by determining a name and a resource identifier, at least one of the name or the resource identifier including a unique identifier.

5. The teleconference server of claim 4, wherein the resource identifier includes a Session Initiation Protocol (SIP) Uniform Resource Identifier (URI).

6. The teleconference server of claim 1, wherein the one or more components are further operable by the processor to perform operations including:
   receiving a second connection request corresponding to a second party via the communications interface, the second connection request specifying the teleconference;
   determining that the second party is a non-self-specified party in the specified teleconference; and
   determining a second party-specific synthetic identifier for the second party.

7. The teleconference server of claim 6, wherein the one or more components are further operable by the processor to perform operations including:
   determining that the party and the second party correspond to a single handle;
   determining the party-specific synthetic identifier for the party based at least in part on the single handle and a handle-unique identifier; and
   determining the second party-specific synthetic identifier for the second party based at least in part on the single handle and a second, different handle-unique identifier.

8. The teleconference server of claim 1, wherein the one or more components are further operable by the processor to perform operations including transmitting, via the communications interface, information of the party-specific synthetic identifier.

9. A telecommunications network, comprising:
   a plurality of terminals; and
   a teleconference server communicatively connectable with the plurality of terminals, wherein the teleconference server is configured to:
      receive from individual ones of the terminals one or more connection requests corresponding to one or more parties;
      determine that one of the parties is a non-self-specified party responsive to the connection request not including caller identification information for the one of the parties, lacking reliable caller identification information for the one of the parties, or including caller identification information that is duplicative of caller identification information of another party participating in the teleconference; and determine a party-specific synthetic identifier for the non-self-specified party.

10. The telecommunications network of claim 9, wherein the teleconference server is further configured to:
receive one or more subscription requests corresponding to respective subscribing parties of the parties; and
transmit notification messages to at least some of the subscribing parties in response to determining the party-specific synthetic identifier.

11. The telecommunications network of claim 9, the teleconference server further configured to:
determine that anonymization has been requested for one or more self-specified parties of the parties; and
in response, determine respective party-specific synthetic identifiers for at least some of the one or more self-specified parties.

12. The telecommunications network of claim 9, the teleconference server further configured to:
receive an invitation request from one of the parties, the invitation identifying a teleconference and a party not participating in the teleconference; and
in response, transmit an invitation message to the party not participating in the teleconference.

13. The telecommunications network of claim 12, the teleconference server further configured to:
receive an invitation response from the party not participating in the teleconference;
determine, based at least in part on the invitation response, that the party not participating in the teleconference is a non-self-specified party;
in response, determine a party-specific synthetic identifier for the party not participating in the teleconference; and
join the party not participating in the teleconference to the teleconference.

14. A method comprising:
receiving, by a processor, a connection request corresponding to a party, the connection request specifying a teleconference;
determining that the party is a non-self-specified party in the specified teleconference responsive to the connection request not including caller identification information for the party, lacking reliable caller identification information for the party, or including caller identification information that is duplicative of caller identification information of another party participating in the teleconference; and
in response, determining a party-specific synthetic identifier for the party.

15. The method of claim 14, further comprising transmitting the party-specific synthetic identifier to at least a teleconference host or the party.

16. The method of claim 14, further comprising:
receiving, by the processor, a transfer request corresponding to a second party, the transfer request including a second party-specific synthetic identifier for the second party;
determining a match between the party-specific synthetic identifier and the second party-specific synthetic identifier;
in response to the match, determining respective revised party-specific synthetic identifier(s) for at least one of the party or the second party.

17. The method of claim 16, further comprising transmitting at least one of the revised party-specific synthetic identifier(s) to at least a teleconference host or the at least one of the party or the second party.

18. The method of claim 14, further comprising:
receiving, by the processor, an instruction to alter the status of the party, the request including the party-specific synthetic identifier; and
in response, modifying status information corresponding to the party-specific synthetic identifier in a memory communicatively connected with the processor.

19. The method of claim 18, wherein the instruction includes an instruction to remove the party from the teleconference and the method further comprises transmitting a removal notification to the party via a communications interface.

* * * * *